US008005490B2

(12) United States Patent  (10) Patent No.: US 8,005,490 B2
Miyake  (45) Date of Patent: Aug. 23, 2011

(54) IN-VEHICLE APPARATUS WITH RADIO TRANSMISSION RESTRICTING FUNCTION AND RADIO TRANSMISSION RESTRICTING SYSTEM

(75) Inventor: Kenji Miyake, Anjo (JP)

(73) Assignee: Denso Corporation, Kariya (JP)

( * ) Notice: Subject to any disclaimer, the term of this patent is extended or adjusted under 35 U.S.C. 154(b) by 591 days.

(21) Appl. No.: 12/215,597

(22) Filed: Jun. 26, 2008

(65) Prior Publication Data

US 2009/0004968 A1    Jan. 1, 2009

(30) Foreign Application Priority Data

Jun. 29, 2007  (JP) ................................. 2007-172627

(51) Int. Cl.
*H04W 24/00* (2009.01)
*H04M 1/00* (2006.01)
(52) U.S. Cl. .................. 455/456.4; 455/41.2; 455/569.2
(58) Field of Classification Search ............... 455/456.4, 455/456.1, 422.1, 414.1, 414.2, 39, 41.2, 455/569.2
See application file for complete search history.

(56) References Cited

U.S. PATENT DOCUMENTS

| 6,625,455 | B1 * | 9/2003 | Ariga ........................... 455/456.1 |
| 6,782,266 | B2 * | 8/2004 | Baer et al. ................... 455/456.4 |
| 6,917,801 | B2 * | 7/2005 | Witte et al. .................... 455/418 |
| 6,973,333 | B1 * | 12/2005 | O'Neil ......................... 455/569.2 |
| 7,200,410 | B2 | 4/2007 | Kuwajima et al. |
| 7,734,315 | B2 * | 6/2010 | Rathus et al. ............... 455/569.2 |
| 7,873,374 | B1 * | 1/2011 | O'Neil ......................... 455/456.4 |
| 2005/0215241 | A1 * | 9/2005 | Okada ......................... 455/414.1 |

FOREIGN PATENT DOCUMENTS

| JP | 2003-134562 | 5/2003 |
| JP | 2004-015567 | 1/2004 |
| JP | 2004-64157 | 2/2004 |
| JP | 2006-203737 | 8/2006 |
| JP | 2007-36720 | 2/2007 |

OTHER PUBLICATIONS

Office action dated Apr. 14, 2008 in Japanese Application No. 2007-172627.

* cited by examiner

*Primary Examiner* — Sonny Trinh
(74) *Attorney, Agent, or Firm* — Harness, Dickey & Pierce, PLC

(57) ABSTRACT

An in-vehicle apparatus determines in the vicinity the presence of a portable terminal designated with a device requiring restriction on radio transmission as a device name thereof. Radio transmission from a cellular phone is thereby restricted. In contrast, when determining in the vicinity the absence of the portable terminal designated with a device requiring restriction on radio transmission, the restriction on radio transmission from the cellular phone is removed. In the event of a person with a cardiac pacemaker getting on the vehicle, if the person carries a portable terminal designated with a device requiring restriction on radio transmission as a device name, the concern of the person about a possibility that the cellular phone has a bad influence on the cardiac pacemaker can be prevented.

15 Claims, 3 Drawing Sheets

IN-VEHICLE APPARATUS WITH RADIO TRANSMISSION RESTRICTING FUNCTION AND RADIO TRANSMISSION RESTRICTING SYSTEM

CROSS REFERENCE TO RELATED APPLICATION

This application is based on and incorporates herein by reference Japanese Patent Application No. 2007-172627 filed on Jun. 29, 2007.

FIELD OF THE INVENTION

The present invention relates to in-vehicle apparatus with a radio transmission restricting function and a radio transmission restricting system.

BACKGROUND OF THE INVENTION

Conventionally, there is apprehension or concern about whether radio waves from cellular phones have bad influence. For example, there is a person to have a concern about a possibility that a medical instrument, such as a cardiac pacemaker may malfunction because of radio waves from cellular phones. To address such a concern, a device dedicated for forcibly restricting radio transmission from a cellular phone is provided. If a certain cellular phone approaches the dedicated device, the radio transmission from the certain cellular phone can be restricted. Further, a zone for restricting radio transmission is previously defined so as to restrict the radio transmission from a cellular phone. When a cellular phone itself determines to be located within the zone for restricting radio transmission, the cellular phone restricts or stops own radio transmission in the zone. (for example, refer to Patent Document 1).

Patent Document 1: JP 2004-15567 A

The above technology or method described in Patent document 1 is practical or effective when the zone for restring radio transmission is previously specified. In other words, it is impossible to switch whether or not to restrict radio transmission from a cellular phone regardless of the zone.

SUMMARY OF THE INVENTION

The present invention is made in view of the above situation. It is an object to provide an in-vehicle apparatus with a radio transmission restricting function and a radio transmission restricting system, both of which can determine whether or not to restrict radio transmission from a cellular phone regardless of a zone.

According to an example of the present invention, an in-vehicle apparatus having a radio transmission restricting function is provided as follows. A phoning control unit is configured to control operation of a phoning device to send a radio wave of a predetermined frequency to a base station. A vicinity searching control unit is configured to perform a search to determine whether or not a portable terminal, which requires a restriction on radio transmission, exists in a vicinity. The phoning control unit is further configured to perform a restriction on radio transmission from the phoning device when it is determined that the portable terminal requiring the restriction exists in the vicinity.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
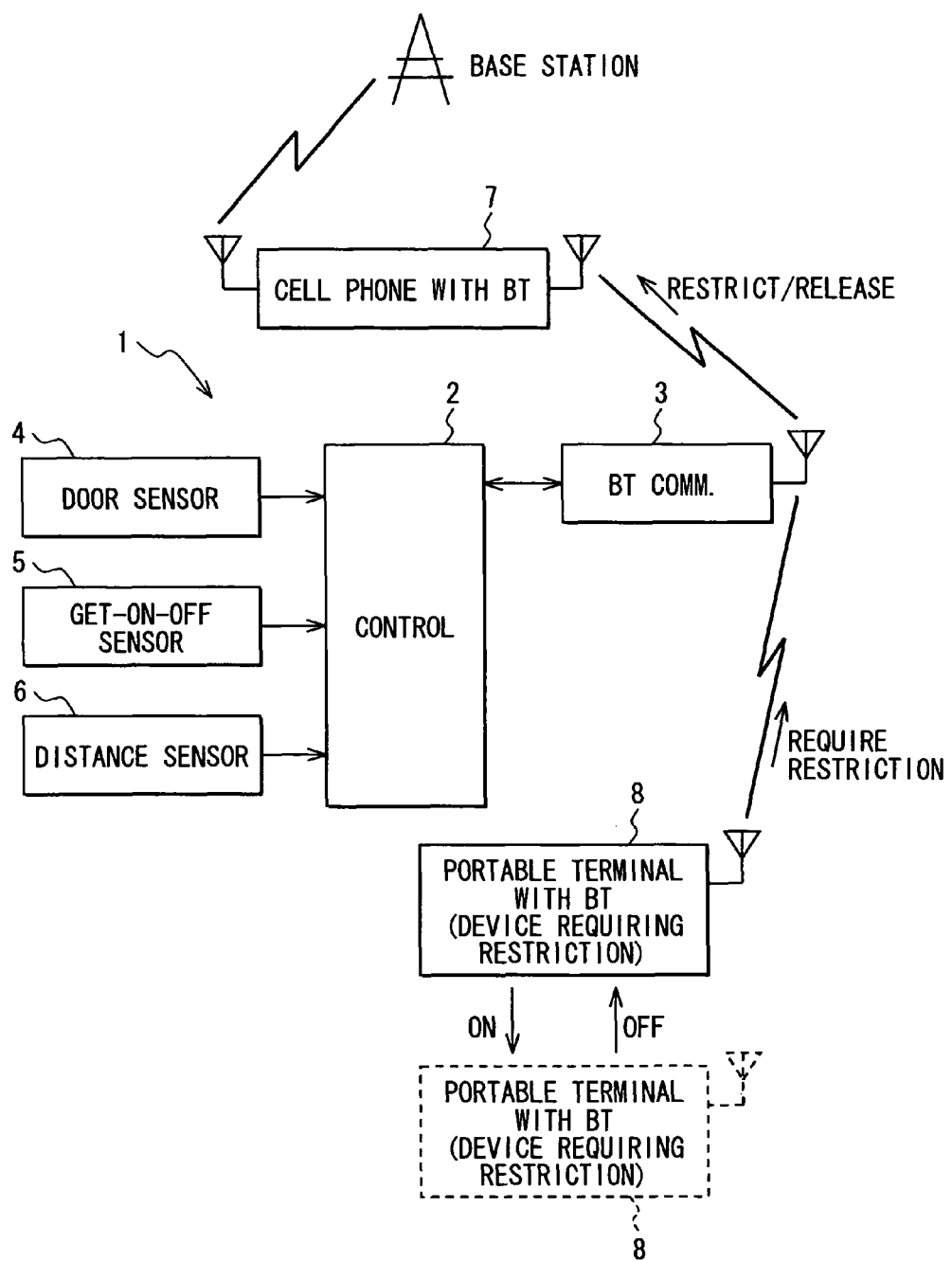
FIG. 1 is a functional block diagram according to a first embodiment of the present invention.

A first embodiment of the present invention is directed to an in-vehicle apparatus mountable in a subject vehicle such a taxi. The first embodiment is explained with reference to FIG. 1 and FIG. 2. The in-vehicle apparatus 1 includes the following: a control device 2 (further referred to as a door determining means or control unit, a get-on-and-off determining means or control unit, a travel distance determining means or control unit, or a vicinity searching means or control unit); a Bluetooth communication device 3 (further referred to as a vicinity terminal search device, or a short range wireless communication device); a door open-and-close detecting sensor 4; a get-on-and-off detecting sensor 5; and a distance detecting sensor 6.

The control device 2 has a CPU, a RAM, a ROM, and an I/O bus, executing a control program to control operation of the whole apparatus. The Bluetooth (registered trademark) communication device 3 forms a predetermined Bluetooth communication area, and performs a Bluetooth communication with a Bluetooth communication device entering the communication area. For instance, the Bluetooth communication device 3 can communicate with a cellular phone 7 (as a phoning device) having a Bluetooth communication function when the cellular phone 7 is brought into the taxi by a driver of the taxi, or a portable terminal 8 having a Bluetooth communication function when the terminal 8 is brought into the taxi by a passenger getting on.

The door open-and-close detecting sensor 4 detects opening and closing of a door (for example, a door facing a rear left seat) via which a passenger gets on and off, and outputs a door open-and-close detection signal indicating an open-and-close state of the door to the control device 2. The get-on-and-off detecting sensor 5 includes a seating sensor, for instance, and detects a passenger's getting on and off to thereby output to the control device 2 a get-on-and-off detection signal indicating passenger's getting on or off. The distance detecting sensor 6 detects a distance the vehicle or taxi travels, and outputs a distance detection signal indicating a travel distance of the vehicle to the control device 2.

In a power-on state, the cellular phone 7 transmits radio waves or radio of a predetermined frequency to a base station of a cellular phone network while receiving radio waves of the predetermined frequency transmitted from the base station. The control device 2 restricts or stops radio transmission from the cellular phone 7 by issuing a radio transmission restriction instruction to the cellular phone 7 via the Bluetooth communication device 3. In contrast, the control device 2 removes the restriction on radio transmission from the cellular phone 7 by issuing a radio transmission restriction release instruction to the cellular phone 7 via the Bluetooth communication device 3. The portable terminal 8 can be assigned or designated with a unique name as a device name specified by a communication protocol of the Bluetooth communication. In the present embodiment, the portable terminal 8 can be assigned or designated with a radio transmission restriction requiring device as specific information. In addition, designating a radio transmission restriction requiring device can be performed by a user to, for example, operate the portable terminal 8. In addition, a power supply to the in-vehicle apparatus 1 is turned ON/OFF in conjunction with an ACC switch is turned ON/OFF.

Figure 2:
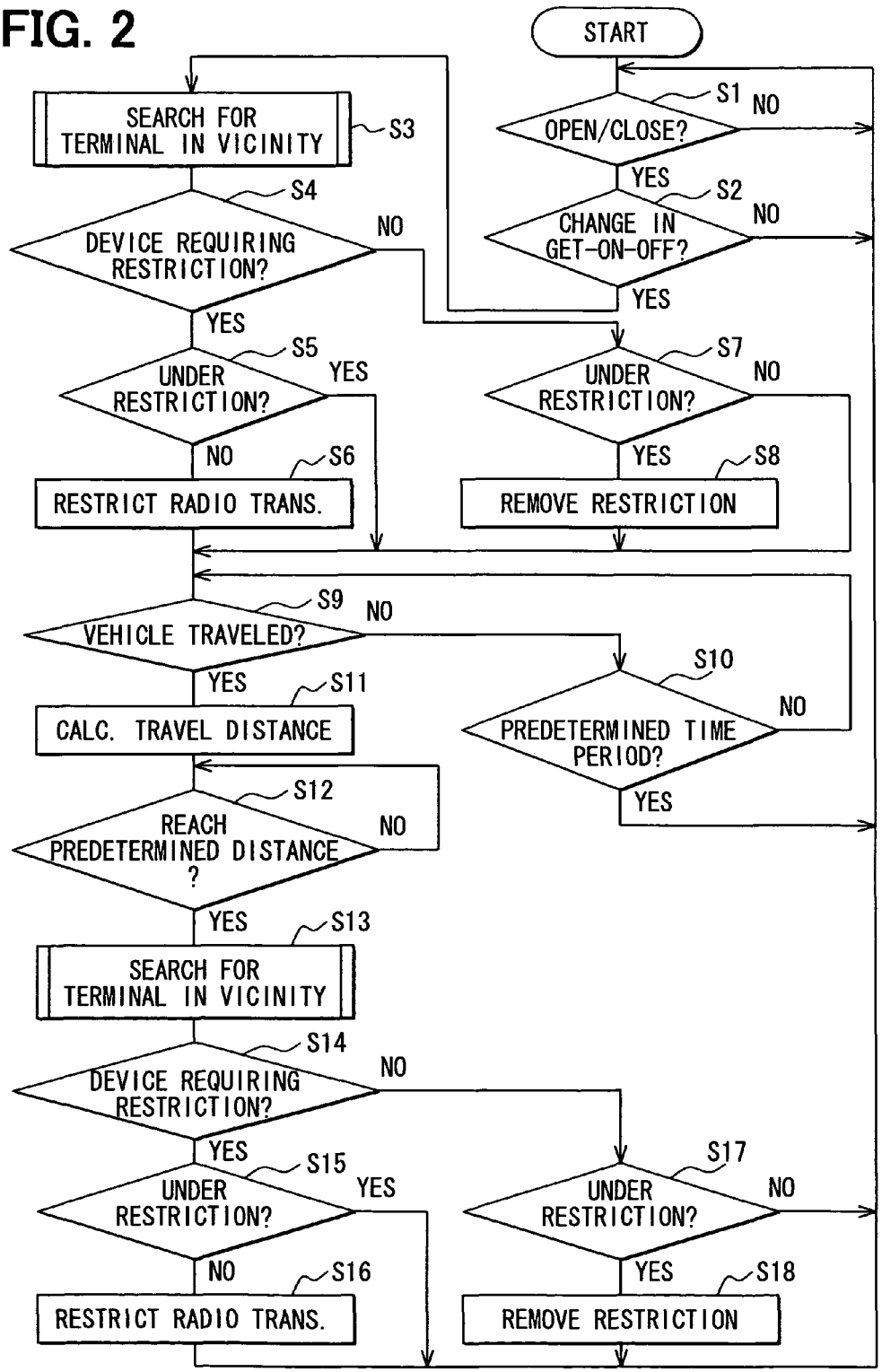
FIG. 2 is a flow chart.

An operation under the above configuration is explained with reference to FIG. 2. It is assumed that the portable terminal 8 is designated with a radio transmission restriction requiring device as a device name.

The control device 2 performs as follows. It is determined whether a door is opened and closed based on a door open-close detection signal inputted from the door open-and-close detecting sensor 4 when the in-vehicle apparatus 1 is in a power-on state (S1). When it is determined that the door is opened and closed ("YES" at S1), it is determined whether a passenger gets on or off (or whether a change occurs in a passenger getting on or off) based on a get-on-and-off detection signal inputted from the get-on-and-off detecting sensor 5 (S2). When the control device 2 determines that the passenger gets on or off ("YES" at S2), the Bluetooth communication device 3 is caused to search for a terminal in the vicinity (S3). Through such a vicinity search process by the Bluetooth communication device 3, the control device 2 is configured to acquire a device name from a portable terminal 8 which exists within the Bluetooth communication area.

Here, the control device 2 acquires a device name of a radio transmission restriction requiring device (or a device requiring restriction on radio transmission) from the portable terminal 8 existing in the communication area. Thus, it is determined that the portable terminal 8 designated with a radio transmission restriction requiring device is present within the Bluetooth communication area ("YES" at S4). It is then determined whether the radio transmission from the cellular phone 7 is under restriction at the present time (S5).

When it is determined that the radio transmission from the cellular phone 7 is not under restriction at the present time ("NO" at S5), the Bluetooth communication device 3 is caused to transmit a radio transmission restriction instruction to the cellular phone 7. The radio transmission from the cellular phone 7 is thus restricted (or stopped) (S6). When it is determined that the radio transmission from the cellular phone 7 is under restriction at the present time ("YES" at S5), a state where the radio transmission from the cellular phone 7 is under restriction is maintained.

In contrast, it may be determined that the portable terminal 8 does not exist within the Bluetooth communication area or that although a portable terminal exists in the Bluetooth communication area, a radio transmission restriction requiring device is not acquired as a device name thereof. In such a case, it is determined that the portable terminal 8 designated with a radio transmission restriction requiring device is not present within the Bluetooth communication area ("NO" at S4). It is then determined whether the radio transmission from the cellular phone 7 is under restriction at the present time (S7).

When it is determined that the radio transmission from the cellular phone 7 is under restriction at the present time ("YES" at S5), the Bluetooth communication device 3 is caused to issue a radio transmission restriction release instruction to the cellular phone 7, thereby removing the restriction on radio transmission from the cellular phone 7 so as to permit the cellular phone 7 to transmit radio waves (S8). When it is determined that the radio transmission from the cellular phone 7 is not under restriction at the present time ("NO" at S7), a state where the radio transmission from the cellular phone 7 is not under restriction is maintained.

Subsequently, it is determined whether the vehicle travels or moves based on a distance detection signal inputted from the distance detecting sensor 6 (S9). It is determined whether a predetermined time passes, for example, since the Bluetooth communication device 3 ends the search for a terminal in the vicinity (S10). Subsequently, when it is determined that the vehicle starts a travel or moves before the predetermined time passes ("YES" at S10), a travel distance after the vehicle starts the travel is calculated (S11). It is then determined whether the travel distance reaches a predetermined distance (S12). When it is determined that the travel distance reaches the predetermined distance ("YES" at S12), the Bluetooth communication device 3 is similarly caused to search for a terminal in the vicinity (S13).

Here, the control device 2 may acquire a device name of a radio transmission restriction requiring device from the portable terminal 8 existing in the Bluetooth communication area. Thus, it is determined that the portable terminal 8 designated with a radio transmission restriction requiring device is present within the Bluetooth communication area ("YES" at S14). It is then determined whether the radio transmission from the cellular phone 7 is under restriction at the present time (S15).

When it is determined that the radio transmission from the cellular phone 7 is not under restriction at the present time ("NO" at S15), the Bluetooth communication device 3 is caused to transmit a radio transmission restriction instruction to the cellular phone 7, restricting the radio transmission from the cellular phone 7 (S16). In contrast, it is determined that the radio transmission from the cellular phone 7 is under restriction at the present time ("YES" at S15), a state where the radio transmission from the cellular phone 7 is under restriction is maintained.

In contrast, it may be determined that a portable terminal does not exist within the Bluetooth communication area or that although a portable terminal exists in the Bluetooth communication area, a radio transmission restriction requiring device is not acquired as a device name thereof. In such a case, it is determined that the portable terminal 8 designated with a radio transmission restriction requiring device is not present within the Bluetooth communication area ("NO" at S14). It is then determined whether the radio transmission from the cellular phone 7 is under restriction at the present time (S17).

When it is determined that the radio transmission from the cellular phone 7 is under restriction at the present time ("YES" at S17), the control device 2 removes the restriction on radio transmission from the cellular phone 7 by issuing a radio transmission restriction release instruction to the cellular phone 7 via the Bluetooth communication device 3 (S18). When it is determined that the radio transmission from the cellular phone 7 is not restricted at the present time ("NO" at S17), a state where the radio transmission from the cellular phone 7 is not restricted is maintained.

As explained above, in the in-vehicle apparatus 1 according to the first embodiment, the following takes place. When it is determined that a portable terminal 8 exists in the vicinity with a radio transmission restriction requiring device designated as a device name, the radio transmission from the cellular phone 7 is restricted or stopped. When it is determined that a portable terminal does not exist in the vicinity with a radio transmission restriction requiring device designated as a device name, the radio transmission restriction relative to the cellular phone 7 is removed or released. Thus, whether or not to restrict radio transmission from the cellular phone 7 can be determined regardless of a zone, which may be previously defined and/or fixed to a specific area. Therefore, in the event of a person with a cardiac pacemaker getting on the vehicle as a passenger, if the person carries a portable terminal 8 designated with a radio transmission restriction requiring device, the radio transmission from the cellular phone 7 can be restricted or stopped. This can prevent the situation where the person with the cardiac pacemaker has apprehension or concern about whether the cellular phone 7 has a bad influence on the cardiac pacemaker.

In addition, after determining that opening and closing of the door is performed and that the change in getting on or off takes place, a search is performed to determine whether the portable terminal 8 exists in the vicinity with a radio transmission restriction requiring device designated as a device name thereof. Thus, such a search for the portable terminal 8 can be performed at the time of the passenger getting on or off.

In addition, after determining that the travel distance reaches a predetermined distance since the travel start of the vehicle, a search is also performed to determine whether the portable terminal 8 exists in vicinity with a radio transmission restriction requiring device designated as a device name thereof. Thus, even at the time of the travel distance reaching the predetermined distance, such a search for the portable terminal 8 can be also performed. For instance, when the taxi stops at a waiting spot, radio transmission may be incorrectly restricted or restriction on radio transmission may be not removed incorrectly. Even in such a case, after a taxi picks up a passenger and starts a travel, the radio transmission or the radio transmission restriction can be appropriately controlled.

Second Embodiment

Figure 3:
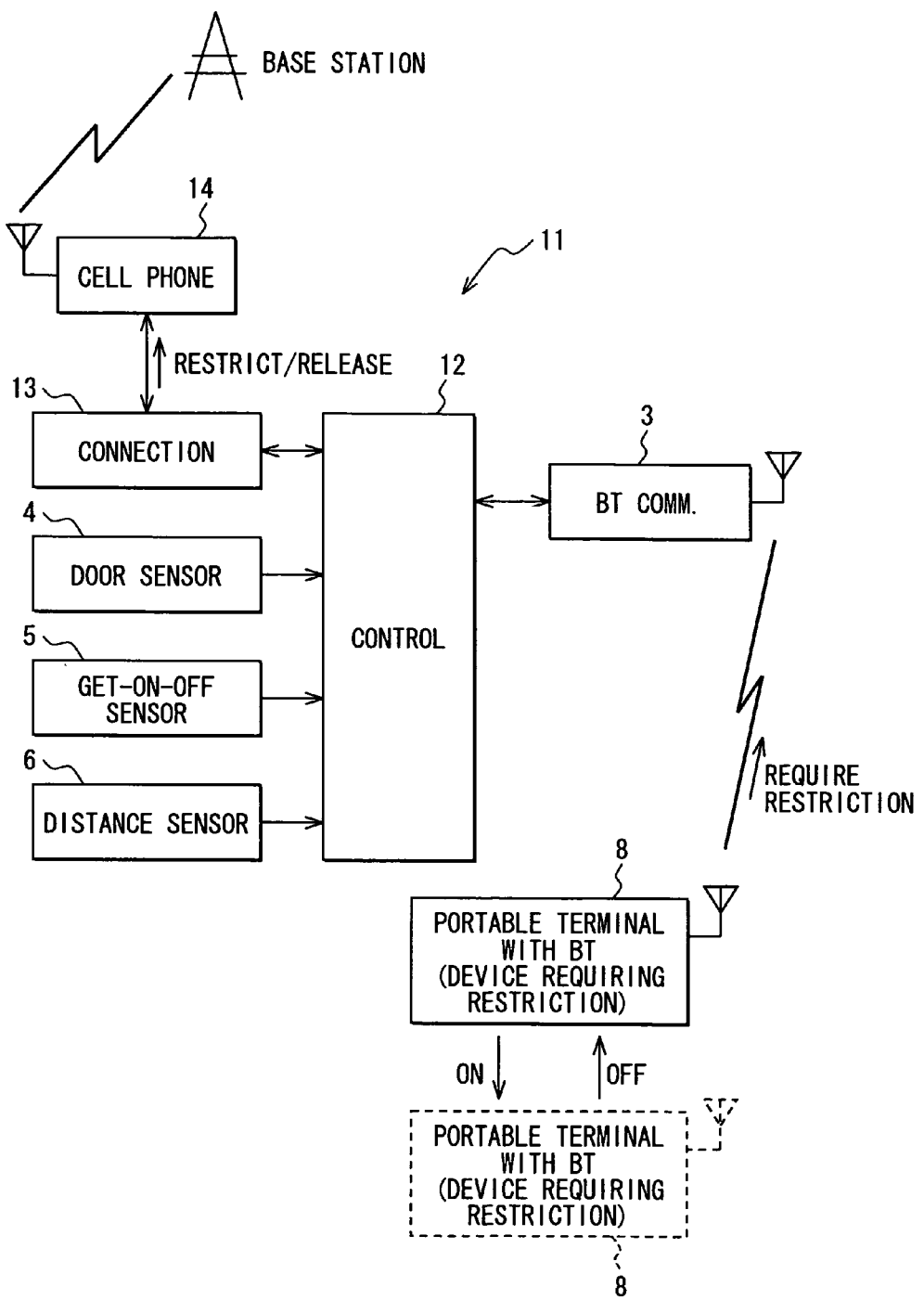
FIG. 3 is a functional block diagram according to a second embodiment of the present invention.

A second embodiment according to the present invention is explained with reference to FIG. 3. In addition, explanation is omitted for the same parts as those in the first embodiment and made for the different parts from the first embodiment. In the first embodiment, the cellular phone 7 wirelessly communicates with the in-vehicle apparatus 1 using the Bluetooth communication. In the second embodiment, a cellular phone communicates with an in-vehicle apparatus in a wired communication line.

An in-vehicle apparatus 1 includes a control device 12 (further referred to as a door open-and-close determining means or control unit, a get-on-and-off determining means or control unit, a travel distance determining means or control unit, or a vicinity searching means or control unit) and a telephone connection device 13 in addition to, of the first embodiment, the Bluetooth communication device 3, the door open-and-close detecting sensor 4, the get-on-and-off detecting sensor 5, and the distance detecting sensor 6.

The telephone connection device 13 can connect a connection cable or terminal with a cellular phone 14 as a phoning device which the driver of the taxi brings to a compartment of the taxi. When the cellular phone 14 is connected via the cable or terminal, a cable communication can be performed between the telephone connection device 13 and the cellular phone 14. In such a case, the control device 12 is configured to transmit a radio transmission restriction instruction to the cellular phone 14 via the telephone connection device 13. Thereby, the radio transmission from the cellular phone 14 is restricted or stopped. Further, a radio transmission restriction release instruction can be transmitted to the cellular phone 14 via the telephone connection device 13. Thereby, the radio transmission restriction relative to the cellular phone 14 can be removed or released.

As explained above, according to the second embodiment, the same advantage as that of the first embodiment can be obtained. When it is determined that a portable terminal 8 exists in the vicinity with a radio transmission restriction requiring device designated as a device name thereof, the radio transmission from the cellular phone 14 is restricted or stopped. In contrast, when it is determined that a portable terminal does not exist in the vicinity with a radio transmission restriction requiring device designated as a device name thereof, the radio transmission restriction relative to the cellular phone 14 is removed or released. Thus, whether to restrict radio transmission of the cellular phone 14 can be determined regardless of a zone, which may be previously determined and/or fixed to a specific area.

Other Embodiments

The present invention is not limited only to the above-mentioned embodiments, and can be modified or extended as follows. The in-vehicle apparatus 1 can be included in a well-known in-vehicle navigation apparatus. The search for the portable terminal 8 is not limited to the method using the Bluetooth communication. Another method using another short range wireless communication can be used. In the first embodiment, a handsfree communication can be also used. The in-vehicle apparatus 1 may include a microphone to receive a transmission speech (sound) and a speaker to output a reception speech (sound) or call. While the radio transmission restriction relative to the cellular phone 7 is removed, by using the handsfree communication, the Bluetooth communication device 3 can receive from the cellular phone 7 the reception speech to be outputted via the speaker and transmit to the cellular phone 7 the transmission speech received via the microphone. In such a configuration, the Bluetooth communication device 3 can be used for the handsfree communication in addition to the search for the portable terminal 8 designated with a radio transmission restriction requiring device as a device name thereof.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, an in-vehicle apparatus with a radio transmission restricting function is provided as follows. A vicinity searching control unit is configured to perform a search to determine whether or not a portable terminal, which requires a restriction on radio transmission, exists in a vicinity. Herein, when it is determined that the portable terminal requiring the restriction exists in the vicinity, a phoning control unit is configured to restrict on radio transmission from a phoning device.

Thus, whether or not to restrict radio transmission from a phoning device such as a cellular phone is determined based on a result from a search whether or not a portable terminal requiring restriction exists in the vicinity, instead of based on a result from determination as to whether or not a phoning device such as a cellular phone exists in a zone for restricting radio transmission. Thus, whether or not to restrict radio transmission from a phoning device can be switched regardless of a zone for restricting radio transmission. That is, in the event of an in-vehicle apparatus with a radio transmission restricting function being brought into a taxi, for example, even if a person with a cardiac pacemaker gets on the taxi as a passenger, the radio transmission from the phoning device can be controllable by the person when carrying a portable terminal which requires restriction on radio transmission. This can prevent the situation where the person with a cardiac pacemaker has apprehension or concern about whether the phoning device has a bad influence on the cardiac pacemaker.

As an optional aspect of the in-vehicle apparatus, the phoning control unit may be further configured to remove the restriction when it is determined that the portable terminal requiring the restriction does not exist in the vicinity while performing the restriction.

Thus, when the portable terminal requiring the restriction is not present in the vicinity, the restriction can be removed promptly to thereby restore or return the phoning device to the state before having restricted the radio transmission therefrom. That is, assuming that an in-vehicle apparatus with a radio transmission restricting function is mounted in a taxi, for example, when a person with a cardiac pacemaker gets off the taxi, restriction on the radio transmission from the phoning device can be removed promptly.

As an optional aspect of the in-vehicle apparatus, a door determining control unit may be configured to determine whether opening and closing of a door, via which a passenger gets on and off, are performed. A get-on-and-off determining control unit may be also configured to determine whether a change occurs in getting on and off via the door. Herein, when it is determined that the opening and the closing of the door are performed and it is determined that the change occurs, the vicinity searching control unit may be further configured to start the search to determine whether or not a portable terminal requiring a restriction on radio transmission exists in a vicinity.

Thus, when opening and closing of the door are performed and change in getting on and off occurs, a search can be performed to determine whether or not a portable terminal requiring restriction on radio transmission exists in the vicinity. That is, if the in-vehicle apparatus with a radio transmission restricting function is mounted in a taxi, such a search for the portable terminal requiring restriction can be performed when a passenger gets on or off the taxi.

As an optional aspect of the in-vehicle apparatus, a distance determining control unit may be configured to determine whether a distance traveled after the vehicle starts a travel reaches a predetermined distance. Herein, when it is determined that the distance reaches the predetermined distance, the vicinity searching control unit is further configured to also start the search to determine whether or not a portable terminal requiring a restriction on radio transmission exists in a vicinity.

Thus, when the travel distance after vehicle's start reaches the predetermined distance, a search can be also performed to determine whether or not a portable terminal requiring restriction exists in the vicinity. That is, assuming that the in-vehicle apparatus with a radio transmission restricting function is mounted in a taxi, for example, when the travel distance after a taxi starts a travel reaches the predetermined distance, a search can be also performed to determine whether or not a portable terminal requiring restriction exists in the vicinity. Before the travel distance of the taxi reaches the predetermined distance (e.g., when the taxi stops at a waiting spot), radio transmission may be incorrectly restricted or restriction is removed incorrectly. Even in such a case, after the travel distance of the taxi reaches the predetermined distance (e.g., after a taxi picks up a passenger and starts a travel), the radio transmission can be restricted correctly or the restriction on the radio transmission can be removed correctly.

As an optional aspect of the in-vehicle apparatus, the vicinity searching control unit may include a short range wireless communication device to perform a short range wireless communication with a portable terminal. The short range wireless communication device may be configured to search for a portable terminal transmitting specific information indicative of a device, which is permitted to require restriction on radio transmission. Thereby, the search can be performed to determine whether a portable terminal requiring a restriction on radio transmission exists in a vicinity. Thus, such a search can be performed in the vicinity by using the short range wireless communication.

As an optional aspect of the in-vehicle apparatus, the short range wireless communication device may be configured to transmit to the phoning device a transmission sound, which is to be transmitted to the base station from the phoning device while receiving from the phoning device a reception sound, which is received by the phoning device from the base station, when the phoning control unit is removing the restriction on radio transmission from the phoning device.

Thus, the short range wireless communication device can be used for a handsfree communication in addition to a search for a portable terminal requiring restriction on radio transmission.

It will be obvious to those skilled in the art that various changes may be made in the above-described embodiments of the present invention. However, the scope of the present invention should be determined by the following claims.

What is claimed is:

1. An in-vehicle apparatus having a radio transmission restricting function and provided in a vehicle, the apparatus comprising:
    a phoning control unit controlling operation of a phoning device to send a radio wave of a predetermined frequency to a base station; and
    a vicinity searching control unit performing a search to determine whether or not a portable terminal, which requires a restriction on radio transmission, exists in a vicinity, wherein
    the phoning control unit performs a restriction on radio transmission from the phoning device when it is determined that the portable terminal requiring the restriction exists in the vicinity;
    the vicinity searching control unit includes a short range wireless communication device performing a short range wireless communication with a portable terminal, the short range wireless communication device searches for a portable terminal transmitting specific information indicative of a device, which is permitted to require a restriction on radio transmission, to thereby perform the search to determine whether a portable terminal requiring a restriction on radio transmission exists in a vicinity; and
    the short range wireless communication device transmits to the phoning device a transmission sound, which is to be transmitted to the base station from the phoning device while receiving from the phoning device a reception sound, which is received by the phoning device from the base station, when the phoning control unit is removing the restriction on radio transmission from the phoning device.

2. The in-vehicle apparatus according to claim 1, wherein the phoning control unit removes the restriction on radio transmission from the phoning device when it is determined that the portable terminal requiring the restriction does not exist in the vicinity while performing the restriction.

3. The in-vehicle apparatus according to claim 1, further comprising:
a door determining control unit determining whether opening and closing of a door, via which a passenger gets on and off, are performed; and
a get-on-and-off determining control unit determining whether a change occurs in getting on and off via the door,
wherein when it is determined that the opening and the closing of the door are performed and it is determined that the change occurs, the vicinity searching control unit starts the search to determine whether or not a portable terminal requiring a restriction on radio transmission exists in a vicinity.

4. The in-vehicle apparatus according to claim 1, further comprising:
a distance determining control unit determining whether a distance traveled after the vehicle starts a travel reaches a predetermined distance,
wherein when it is determined that the distance reaches the predetermined distance, the vicinity searching control unit starts the search to determine whether or not a portable terminal requiring a restriction on radio transmission exists in a vicinity.

5. A radio transmission restricting system comprising:
the in-vehicle apparatus with the radio transmission restricting function according to claim 1; and
a portable terminal transmitting specific information indicative of a device, which is permitted to require a restriction on radio transmission when existing in a communication area of the short range wireless communication device.

6. An in-vehicle apparatus having a radio transmission restricting function and provided in a vehicle, the apparatus comprising:
a phoning control unit controlling operation of a phoning device to send a radio wave of a predetermined frequency to a base station;
a vicinity searching control unit performing a search to determine whether or not a portable terminal, which requires a restriction on radio transmission, exists in a vicinity,
a door determining control unit determining whether opening and closing of a door, via which a passenger gets on and off, are performed; and
a get-on-and-off determining control unit determining whether a change occurs in getting on and off via the door, wherein
the phoning control unit performs a restriction on radio transmission from the phoning device when it is determined that the portable terminal requiring the restriction exists in the vicinity; and
when it is determined that the opening and the closing of the door are performed and it is determined that the change occurs, the vicinity searching control unit starts the search to determine whether or not a portable terminal requiring a restriction on radio transmission exists in a vicinity.

7. The in-vehicle apparatus according to claim 6, wherein the phoning control unit removes the restriction on radio transmission from the phoning device when it is determined that the portable terminal requiring the restriction does not exist in the vicinity while performing the restriction.

8. The in-vehicle apparatus according to claim 6, further comprising:
a distance determining control unit determining whether a distance traveled after the vehicle starts a travel reaches a predetermined distance,
wherein when it is determined that the distance reaches the predetermined distance, the vicinity searching control unit starts the search to determine whether or not a portable terminal requiring a restriction on radio transmission exists in a vicinity.

9. The in-vehicle apparatus according to claim 6, wherein the vicinity searching control unit includes a short range wireless communication device performing a short range wireless communication with a portable terminal, the short range wireless communication device searches for a portable terminal transmitting specific information indicative of a device, which is permitted to require a restriction on radio transmission, to thereby perform the search to determine whether a portable terminal requiring a restriction on radio transmission exists in a vicinity.

10. The in-vehicle apparatus according to claim 9, wherein the short range wireless communication device transmits the phoning device a transmission sound, which is to be transmitted to the base station from the phoning device while receiving from the phoning device a reception sound, which is received by the phoning device from the base station, when the phoning control unit is removing the restriction on radio transmission from the phoning device.

11. An in-vehicle apparatus having a radio transmission restricting function and provided in a vehicle, the apparatus comprising:
a phoning control unit controlling operation of a phoning device to send a radio wave of a predetermined frequency to a base station;
a vicinity searching control unit performing a search to determine whether or not a portable terminal, which requires a restriction on radio transmission, exists in a vicinity, wherein
a distance determining control unit determining whether a distance traveled after the vehicle starts a travel reaches a predetermined distance, wherein
the phoning control unit performs a restriction on radio transmission from the phoning device when it is determined that the portable terminal requiring the restriction exists in the vicinity; and
when it is determined that the distance reaches the predetermined distance, the vicinity searching control unit starts the search to determine whether or not a portable terminal requiring a restriction on radio transmission exists in a vicinity.

12. The in-vehicle apparatus according to claim 11, wherein
the phoning control unit removes the restriction on radio transmission from the phoning device when it is determined that the portable terminal requiring the restriction does not exist in the vicinity while performing the restriction.

13. The in-vehicle apparatus according to claim 11, further comprising:
a door determining control unit determining whether opening and closing of a door, via which a passenger gets on and off, are performed; and
a get-on-and-off determining control unit determining whether a change occurs in getting on and off via the door, wherein when it is determined that the opening and the closing of the door are performed and it is determined that the change occurs, the vicinity searching control unit starts the search to determine whether or not a portable terminal requiring a restriction on radio transmission exists in a vicinity.

14. The in-vehicle apparatus according to claim 11, wherein the vicinity searching control unit includes a short range wireless communication device performing a short range wireless communication with a portable terminal, the short range wireless communication device searches for a portable terminal transmitting specific information indicative of a device, which is permitted to require a restriction on radio transmission, to thereby perform the search to determine whether a portable terminal requiring a restriction on radio transmission exists in a vicinity.

15. The in-vehicle apparatus according to claim 14, wherein the short range wireless communication device transmits the phoning device a transmission sound, which is to be transmitted to the base station from the phoning device while receiving from the phoning device a reception sound, which is received by the phoning device from the base station, when the phoning control unit is removing the restriction on radio transmission from the phoning device.

\* \* \* \* \*